(12) United States Patent
Kim et al.

(10) Patent No.: US 8,440,363 B2
(45) Date of Patent: May 14, 2013

(54) ELECTRODE FOR FUEL CELL AND FUEL CELL COMPRISING SAME

(75) Inventors: Jan-Dee Kim, Suwon-si (KR);
Yeong-Chan Eun, Suwon-si (KR);
Seong-Jin An, Suwon-si (KR);
Sung-Yong Cho, Suwon-si (KR);
Ho-Jin Kweon, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1117 days.

(21) Appl. No.: 11/213,336

(22) Filed: Aug. 25, 2005

(65) Prior Publication Data
US 2006/0057452 A1    Mar. 16, 2006

(30) Foreign Application Priority Data
Aug. 25, 2004    (KR) .................. 10-2004-0067020

(51) Int. Cl.
*H01M 4/02* (2006.01)
*H01M 8/10* (2006.01)

(52) U.S. Cl.
USPC ............................. 429/480; 429/481; 429/523

(58) Field of Classification Search ............. 204/290.07; 429/40
See application file for complete search history.

(56) References Cited

U.S. PATENT DOCUMENTS

| | | | |
|---|---|---|---|
| 4,810,600 A | 3/1989 | Périard et al. | |
| 5,019,311 A * | 5/1991 | Koslow | 264/122 |
| 5,115,057 A * | 5/1992 | Ono et al. | 526/256 |
| 5,620,807 A * | 4/1997 | Mussell et al. | 429/514 |
| 6,103,077 A | 8/2000 | DeMarinis et al. | |
| 7,510,592 B2 * | 3/2009 | Majima et al. | 75/370 |
| 2002/0041992 A1 * | 4/2002 | Zuber et al. | 429/44 |
| 2003/0158273 A1 * | 8/2003 | Kosako et al. | 521/27 |
| 2004/0115517 A1 * | 6/2004 | Fukuda et al. | 429/44 |

FOREIGN PATENT DOCUMENTS

| | | |
|---|---|---|
| CN | 88 1 00116 A | 7/1988 |
| JP | 7-134992 A | 5/1995 |
| JP | 8-236123 A | 9/1996 |
| JP | 10-92440 A | 4/1998 |
| JP | 11-273688 A | 10/1999 |
| JP | 2002-289230 A | 10/2002 |
| JP | 2003-77479 A | 3/2003 |
| JP | 2003-282079 | 10/2003 |
| JP | 2003-303595 A | 10/2003 |
| JP | 2005-510829 A | 4/2005 |
| WO | WO2005/065868 A1 * | 7/2005 |

OTHER PUBLICATIONS

Patent Abstracts of Japan, Publication No. 2003-282079, dated Oct. 3, 2003, in the name of Eiishi Yasumoto et al.

* cited by examiner

*Primary Examiner* — Maria J Laios

(74) *Attorney, Agent, or Firm* — Christie, Parker & Hale, LLP

(57) ABSTRACT

The present invention relates to an electrode for a fuel cell containing a catalyst layer, a gas diffusion layer including a conductive substrate, and a micro-porous layer interposed between the catalyst layer and the gas diffusion layer and including a conductive material and a dispersant.

3 Claims, 2 Drawing Sheets

US 8,440,363 B2

ELECTRODE FOR FUEL CELL AND FUEL CELL COMPRISING SAME

CROSS REFERENCE TO RELATED APPLICATION

This application claims priority to and the benefit of Korean patent application No. 10-2004-0067020 filed in the Korean Intellectual Property Office on Aug. 25, 2004, the entire disclosure of which is incorporated herein by reference.

FIELD OF THE INVENTION

The present invention relates to an electrode for a fuel cell and a fuel cell comprising the same, and more particularly to an electrode for a fuel cell capable of improving the life-span of a fuel cell and a fuel cell comprising the same.

BACKGROUND OF THE INVENTION

A fuel cell is an electric power generation system that generates electrical energy through a chemical reaction of oxygen and hydrogen contained in a hydrocarbon-based material such as methanol, ethanol, or natural gas Fuel cells can be classified as phosphoric acid type, molten carbonate type, solid oxide type, polymer electrolyte type, or alkaline type, depending on the kind of electrolyte used. Although each fuel cell basically operates in accordance with the same principles, the kind of fuel, the operating temperature, the catalyst, and the electrolyte may be selected depending upon the type of fuel cell.

Recently, polymer electrolyte membrane fuel cells (PEMFCs) have been developed with power characteristics superior to those of conventional fuel cells, lower operating temperatures, and faster starting and response characteristics. PEMFCs have advantages in that they can be applied to wide fields such as for portable electrical power sources for automobiles, for distributed power sources such as for houses and public buildings, and for small electrical power sources for electronic devices.

A polymer electrolyte fuel cell is essentially composed of a stack, a reformer, a fuel tank, and a fuel pump. The fuel pump provides the fuel stored in the fuel tank to the reformer. The reformer reforms the fuel to generate the hydrogen gas and supplies the hydrogen gas to the stack. The stack forms the body of the polymer electrolyte fuel cell and is where the hydrogen is electrochemically reacted with oxygen to generate the electrical energy.

In a direct methanol fuel cell (DMFC), liquid methanol fuel is directly introduced to the stack. Consequently, the direct methanol fuel cell can omit the reformer which is essential for the polymer electrolyte fuel cell.

According to the above-mentioned fuel cell system, the stack generally includes several or several tens of unit cells consisting of a membrane electrode assembly (MEA) and a separator (or referred to as a "bipolar plate") laminated together. The membrane electrode assembly is composed of an anode (referred to as a "fuel electrode" or "oxidation electrode") and a cathode (referred to as an "air electrode" or "reduction electrode") separated by the polymer electrolyte membrane.

The performance of a fuel cell depends on the electrode which participates in the electrochemical oxidation and reduction reactions, and therefore, research is being undertaken for improvements of the electrode.

SUMMARY OF THE INVENTION

An embodiment of the present invention provides a composition for forming a micro-porous layer for an electrode for a fuel cell in which the storage stability and adherence of the composition are increased.

Another embodiment of the present invention provides a fuel cell including the above-mentioned electrode.

According to one embodiment of the present invention, an electrode for a fuel cell is provided which includes a catalyst layer; a gas diffusing layer including a conductive substrate; and a micro-porous layer interposed between the catalyst layer and the gas diffusing layer and including a conductive material, a dispersant, and a fluorinated resin.

According to another embodiment of the present invention, a fuel cell is provided including at least one membrane-electrode assembly including an anode electrode and a cathode electrode facing each other, and a polymer electrolyte membrane positioned between the anode and cathode; and a separator contacting at least one of the anode and cathode and formed with a flow channel providing gas, wherein at least one of the anode and the cathode comprises a catalyst layer; a micro-porous layer including a conductive material, a dispersant, and a fluorinated resin; and a gas diffusing layer including a conductive substrate.

According to a method of the present invention, a method of fabricating a fuel cell is provided including: providing a coating composition for a micro-porous layer including a conductive material, a dispersant, and a fluorinated resin; coating the coating composition for the micro-porous layer on the conductive substrate to provide a micro-porous layer; and providing a catalyst layer on the micro-porous layer.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1:
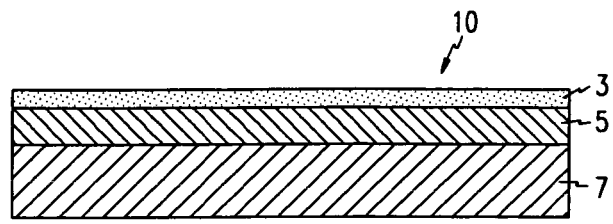
FIG. 1 is a schematic cross-sectional view showing the structure of an electrode for a fuel cell according to an embodiment of the present invention.

The present invention relates to an electrode for a fuel cell. The electrode typically includes a gas diffusion layer 1 and a catalyst layer, and may further include a micro-porous layer interposed between the gas diffusion layer and the catalyst layer in order to improve the gas diffusion effect. The conventional micro-porous layer is prepared by the steps of mixing a carbon powder, polytetrafluoroethylene, and alcohol to provide a composition, and coating it on a gas diffusion layer of a conductive substrate. However, since the carbon powder is not well dispersed, layer separation may occur leading to unsatisfactory storability such that it is not suitable for mass producing fuel cells.

According to one embodiment of the present invention, a dispersant is used in forming the micro-porous layer to improve the dispersion capability of carbon powder and inhibit layer separation. In addition, as the dispersant is a polymer, it can provide the composition with both binding and carbon diffusion effects to improve binding ability so that both the life-span of the fuel cell is improved and the storage stability is improved.

The electrode for the fuel cell according to an embodiment of the present invention comprises a catalyst layer, a gas diffusion layer of a conductive substrate, and a micro-porous layer positioned between the catalyst layer and the gas diffusion layer, and including a conductive material, a dispersant, and a fluorinated resin.

According to the present invention, the dispersant preferably includes a water-soluble polymer such as polyvinyl pyrrolidone, polyvinyl alcohol, poly(vinyl acetate), polyethylene oxide, alkylated polyethylene oxide, or cross-linked polyethylene oxide.

The dispersant also helps to increase the viscosity of the composition for the micro-porous layer, improving productivity. In addition, the dispersant may act as a binder to improve the binding ability among the composition, the catalyst layer, and the gas diffusion layer, so that the life-span of the fuel cell is improved.

According to an embodiment of the present invention, the micro-porous layer is fabricated by providing a composition for a micro-porous layer including a conductive material, a dispersant, a fluorinated resin, and a solvent, and coating the composition on a gas diffusion layer.

According to one embodiment of the invention, the conductive material, the dispersant, and the fluorinated resin are mixed at a weight ratio from 30 to 80:1 to 30:10 to 50, and preferably at from 50 to 70:5 to 15:15 to 40. If the dispersant is provided at less than the lower limit of the range, the carbon dispersion is not sufficient. When the dispersant is added at more than the upper limit, the pores may become clogged, and it is difficult to carry out the gas diffusion. Furthermore, when the fluorinated resin is added at less than the lower limit of the above-mentioned range, the hydrophobic property is deteriorated so that water management is difficult. At more than the upper limit, the pores are clogged so that it is difficult to carry out the gas diffusion which deteriorates the properties.

The coating process may include, but is not limited to, slurry coating, screen printing, spray coating, gravure coating, dip coating, silk screening, and painting.

The conductive material may comprise, but is not limited to, carbon powder, carbon black, acetylene black, active carbon, carbon fiber, and nano carbon such as carbon nano-horns or carbon nano rings, carbon nano tubes, carbon nano fiber, and carbon nano wire.

The fluorinated resin may include, but is not limited to, polytetrafluoro ethylene, polyvinylidene fluoride, polyhexafluoro propylene, polyperfluoroalkylvinyl ether, polyperfluoro sulphonylfluoride alkoxy vinyl ether, and copolymers thereof.

The solvent may include, but is not limited to, an alcohol such as ethanol, isopropyl alcohol, ethyl alcohol, n-propyl alcohol, or butyl alcohol; water; dimethylacetamide (DMAc); dimethyl formamide, dimethyl sulfoxide (DMSO); N-methylpyrrolidone; or tetrahydrofurane. In one embodiment of the invention, a mixed solvent of alcohol and water is used.

The gas diffusion layer may include, but is not limited to, carbon paper or carbon fabric. The gas diffusion layer acts to support the electrode for the fuel cell and to diffuse the reaction gas to a catalyst layer so that the reaction gas is easily contacted with the catalyst layer.

The catalyst layer for the electrode according to the present invention includes a catalyst to help the related reaction (oxidation of hydrogen and reduction of oxygen). Suitable catalysts include platinum, ruthenium, osmium, platinum-ruthenium alloys, platinum-osmium alloys, platinum-palladium alloys, or platinum-M alloys where M is at least one metal selected from the group consisting of Ga, Ti, V, Cr, Mn, Fe, Co, Ni, Cu, and Zn. Preferred catalysts are selected from the group consisting of platinum, ruthenium, osmium, platinum-ruthenium alloys, platinum-osmium alloys, platinum-palladium alloys, platinum-cobalt alloys, and platinum-nickel alloys.

The catalyst is generally supported with a carrier. Suitable carriers include carbon such as acetylene black and graphite, and inorganic particulates such as alumina, silica, zirconia, and titania. When the catalyst is a noble metal supported with a carrier, it may include one of those commercially available that are already provided with a carrier, or be prepared by supporting the noble metal on a carrier. Since the process to support the noble metal on a carrier is known to the art, it is omitted from this description.

The cathode and anode in the fuel cell are classified depending upon the role played in the electrochemical reactions but not upon the material. That is, the fuel cell includes a cathode for oxidizing hydrogen and an anode for reducing oxygen. Accordingly, the electrode for the fuel cell according to the present invention may be applied to both electrodes of the cathode and the anode. That is, hydrogen or fuel is supplied to the anode and oxygen is supplied to the cathode in the fuel cell to generate the electricity due to the electrochemical reaction between the anode and the cathode. The organic fuel is oxidized in the anode and the oxygen is reduced in the cathode to generate the voltage gradient between two electrodes.

Figure 2:
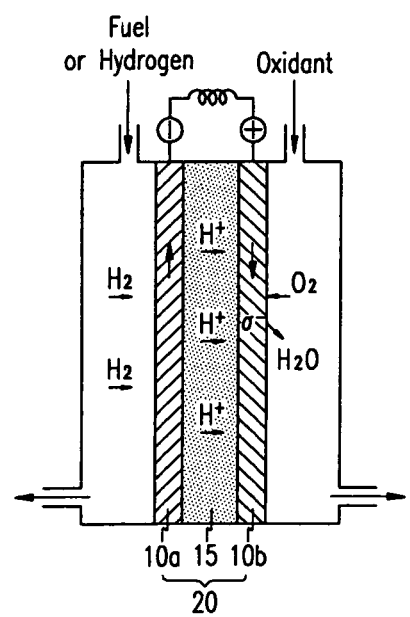
FIG. 2 is a schematic view showing the operation of a fuel cell including the electrode according to the present invention.

FIG. 1 shows an electrode for the fuel cell 10 formed with a catalyst layer 3, a micro-porous layer 5, and a gas diffusion layer 7. FIG. 2 shows a fuel cell including a cathode 10a and an anode 10b composed of the above-mentioned electrode according to the present invention and a membrane-electrode assembly 20 in which a polymer membrane 15 is interposed between the cathode 10a and the anode 10b.

The polymer membrane 15 is composed of a proton-conductive polymer material, that is, an ionomer. The proton-conducting polymer may be any polymer resin having a proton conductive functional group selected from the group consisting of a sulfonic acid group, a carboxylic acid group, a phosphoric acid group, a phosphonic acid group, and derivatives thereof at its side chain. The proton-conducting polymer may be selected from the group consisting of perfluoro-based polymers, benzimidazole-based polymers, polyimide-based polymers, polyetherimide-based polymers, polyphenylene sulfide-based polymers, polysulfone-based polymers, polyethersulfone-based polymers, polyetherketone-based polymers, polyetheretherketone-based polymers, and polyphenylquinoxaline-based polymers. In one embodiment, the proton-conducting polymer may include but is not limited to a polymer selected from the group consisting of poly(perfluorosulfonic acid), poly(perfluorocarboxylic acid), co-polymers of tetrafluoroethylene and fluorovinylether containing sulfonic acid groups, defluorinated polyetherketone sulfides, aryl ketones, poly(2,2'-(m-phenylene)-5,5'-bibenzimidazole), and poly(2,5-benzimidazole). However, according to the present invention, a proton-conducting polymer included in a polymer electrolyte membrane for a fuel cell is not limited to these polymers. The polymer electrolyte membrane has a thickness ranging from 10 to 200 µm.

The membrane-electrode assembly 10 is inserted between separators formed with a gas flow channel and a cooling channel to provide a unit cell, and laminated to provide a stack. It is then inserted between two end plates to provide a fuel cell. The fuel cell can be easily fabricated according to the common techniques in the art.

The following examples further illustrate the present invention in detail, but are not to be construed to limit the scope thereof.

Example 1

A conductive material comprising Vulcan X, polyvinylpyrrolidone, and polytetrafluoro ethylene in a weight ratio of 70:15:15 were mixed with a solvent of isopropyl alcohol and water to provide a coating composition for a micro-porous layer. The coating composition was coated on a gas diffusion layer of carbon paper to provide a micro-porous layer.

Then, a catalyst slurry was coated on the micro-porous layer to provide a catalyst layer and to provide an electrode for a fuel cell. The catalyst slurry was prepared by mixing a platinum-supported carbon powder (Pt/C) with a Nafion™ solution in a mixed solution of isopropyl alcohol and water.

Between the cathode and the anode, a perfluorosulfonic acid polymer (Nafion 112™) membrane was positioned and hot-pressed to provide a membrane-electrode assembly.

The resulting membrane-electrode assembly was inserted between two sheets of gaskets, and inserted between two separators, each formed with a gas flow channel and a cooling channel and compressed between copper end plates to provide a unit cell.

Comparative Example 1

Carbon powder and polytetrafluoro ethylene were mixed in a weight ratio of 75:25 with a mixed solvent of isopropyl alcohol and water to provide a coating composition for a micro-porous layer. The coating composition was coated on a gas diffusion layer in which carbon paper was treated with a water-repellent treatment of polytetrafluoro ethylene to provide a gas diffusion layer with the micro-porous layer.

Then, a catalyst slurry was coated on the micro-porous layer to provide a catalyst layer and to provide an electrode for a fuel cell. The catalyst slurry was prepared by mixing a platinum-supported carbon powder (Pt/C) with perfluorosulfonic acid polymer in a mixed solution of isopropyl alcohol and water.

Between the cathode and the anode, a perfluorosulfonic acid polymer (Nafion 112™) membrane was positioned and hot-pressed to provide a membrane-electrode assembly.

The resulting membrane-electrode assembly was inserted between two sheets of gaskets, and inserted between two separators, each having a gas flow channel and a cooling channel and compressed between copper end plates to provide a unit cell.

Figure 3:
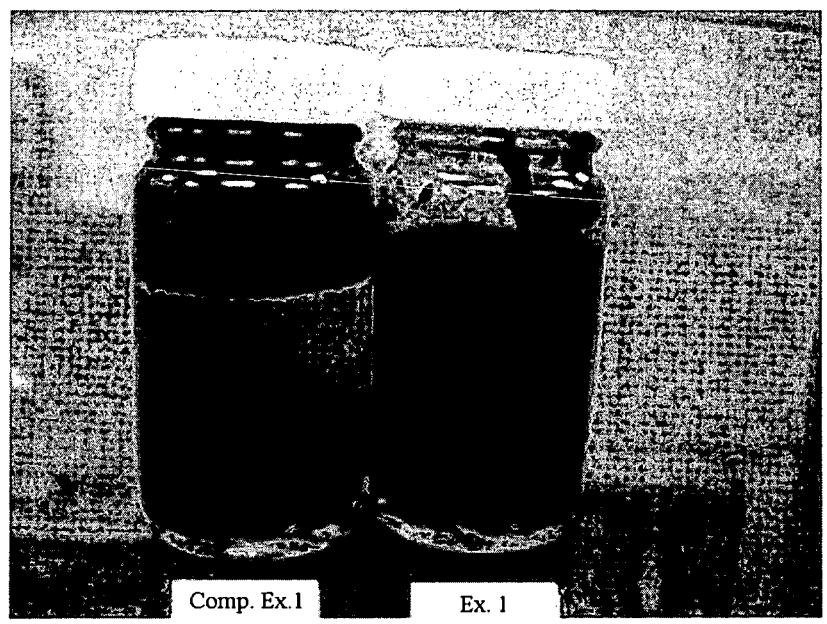
FIG. 3 is a photograph showing layer separation of compositions for forming micro-porous layers according to Example 1 and Comparative Example 1.

In order to evaluate the layer separation of the compositions according to Example 1 and Comparative Example 1, the compositions were retained for one week. As shown in FIG. 3, layer separation did not occur after one week in the composition according to Example 1 including the dispersant, whereas layer separation occurred about 10 seconds after preparation of the composition according to Comparative Example 1.

As described above, since the electrode for the fuel cell of the present invention employs a dispersant when preparing the micro-porous layer, the productivity is improved and the conductive material is better dispersed to prevent the layer separation of the composition for forming the micro-porous layer. Further, the stability for storing the composition for the micro-porous layer is improved to be better suitable for mass production. Still further, since the dispersant is a polymer, it can act as a binder and diffuse the carbon to improve binding ability so that the life-span of the fuel cell is improved.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A fuel cell comprising an electrode comprising:
   a catalyst layer;
   a gas diffusion layer comprising a conductive substrate; and
   a micro-porous layer in the fuel cell between the catalyst layer and the gas diffusion layer and comprising a conductive material, a dispersant, and a fluorinated resin at a weight ratio from 30 to 80: from 5 to 30: from 10 to 50, wherein the dispersant comprises polyvinyl pyrrolidone.

2. The fuel cell according to claim 1, wherein the micro-porous layer comprises the conductive material, the dispersant, and the fluorinated resin at a weight ratio from 50 to 70: from 5 to 15: from 15 to 40.

3. The fuel cell according to claim 1, wherein the catalyst is selected from the group consisting of platinum, ruthenium, osmium, platinum-ruthenium alloys, platinum-osmium alloys, platinum-palladium alloys, and platinum-M alloys where M is at least one metal selected from the group consisting of Ga, Ti, V, Cr, Mn, Fe, Co, Ni, Cu, and Zn.

* * * * *